June 19, 1962
C. B. ELLIS
3,039,946
ADJUSTMENT SYSTEM FOR FLUID FUEL NUCLEAR REACTORS
Filed Nov. 15, 1957
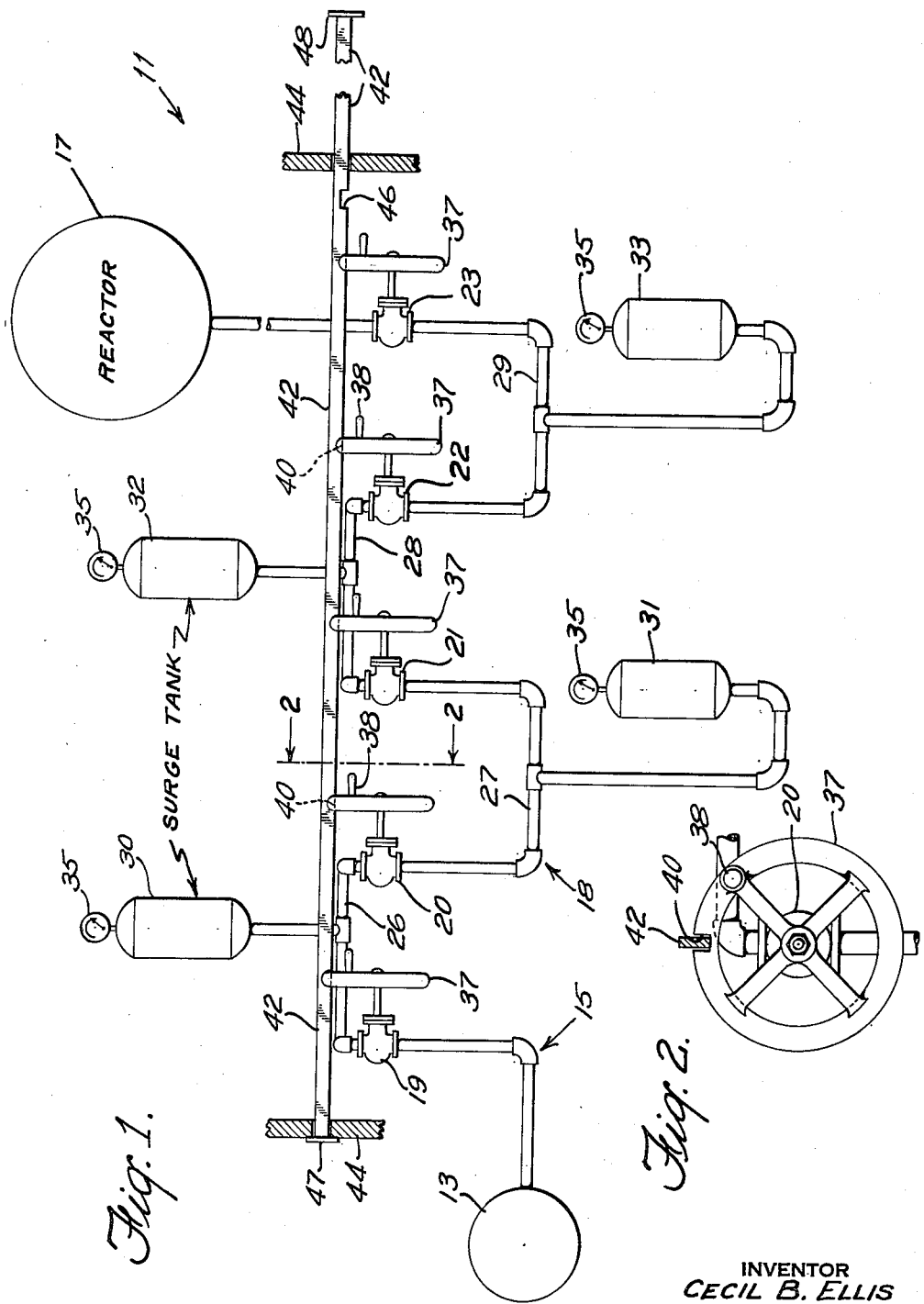
INVENTOR
*CECIL B. ELLIS*
BY *C. N. Miranda*
ATTORNEY

United States Patent Office 3,039,946
Patented June 19, 1962

3,039,946
ADJUSTMENT SYSTEM FOR FLUID FUEL
NUCLEAR REACTORS
Cecil B. Ellis, White Plains, N.Y., assignor to Foster Wheeler Corporation, New York, N.Y., a corporation of New York
Filed Nov. 15, 1957, Ser. No. 696,855
3 Claims. (Cl. 204—193.2)

This invention relates to the operation of fluid fuel nuclear reactors and more particularly to an adjustment system for supplying regulated amounts of fuel or additives to a nuclear reactor during operation of the same.

In the operation of a fluid-fuel nuclear reactor, it is necessary, periodically, to make adjustments in the composition of the fuel stream. New fissionable material must be added to compensate for the material burned during operation and also to counteract the poisoning effect of fission products which appear in the system. For some types of fluid fuels it is also necessary to add liquids for such purposes as the adjustment of acid content or the maintenance of the proper concentration of a corrosion inhibitor. In altering the fuel composition while the reactor is in operation, care must be taken to prevent the addition of excess fuel or additives because rapid changes in the content of the fuel stream may cause a dangerous power excursion.

It is an object of the present invention to provide a novel adjustment system for safely adding fuel or additives to a fluid-fuel nuclear reactor while in operation.

The present invention contemplates a novel adjustment system for fluid-fuel nuclear reactors wherein conduit means communicate a liquid reservoir with a nuclear reactor. A plurality of valves are series-connected in the conduit means to supply regulated amounts of liquid from the reservoir to the reactor in slug-like fashion rather than continuously. Surge tanks are connected at spaced points to the conduit means to serve as surge volumes and means are provided to prevent operation of a valve until the preceding valve is closed.

The above and other objects and advantages of the present invention will appear more fully hereinafter from an understanding of the detailed description which follows taken together with the accompanying drawings wherein one embodiment of the invention is illustrated.

In the drawings:

FIG. 1 is a view of an adjustment system for a fluid-fuel nuclear reactor and constitutes an embodiment of the present invention; and FIG. 2 is a side elevational view, partly in section, and shows, more particularly, the cooperation of the sliding locking bar of FIG. 1 in a slot in the valve actuating wheel member.

Referring now to the drawings and more particularly to FIG. 1 hereof, the present invention comprises an adjustment system, generally designated by the numeral 11, which includes a liquid reservoir or container 13 connected by conduit means 15 to a fluid-fuel nuclear reactor 17. The liquid in reservoir 13 may be, for example, make-up fuel for addition to the reactor 17, or an additive for adjusting the acid content and/or concentration of a corrosion inhibitor in the reactor. Conduit means 15 has disposed therein a plurality of conventional valves, as for example gate valves 19, 20, 21, 22 and 23 which are spaced apart to define pipe sections 26, 27, 28 and 29, respectively. Surge tanks 30, 31, 32 and 33 are connected to pipe sections 26, 27, 28 and 29, respectively, and serve as surge volumes. The surge volumes are maintained under pressure by an inert gas, as for example argon, and such pressure may be measured and indicated by pressure gages 35 connected to the tops of the tanks.

Each of the valves 19, 20, 21, 22 and 23 is provided with an actuating wheel member 37 and a handle 38 for operating the valve. The valves are so constructed that movement of the valves from "closed" to "full open" positions is effected in about one-quarter revolution of the wheel members 37. A slot 40 (FIG. 2) is formed in the periphery of each of the wheel members 37 to accommodate a sliding valve-locking bar 42 for movement therein, and the bar is supported in mounting brackets 44 (partially shown). Bar 42 is provided with a release slot 46 which, when moved into alignment with a wheel member 37, allows rotation of the latter. Stop members 47 and 48 are provided at the ends of bar 42 and serve to limit movement of the bar in extreme positions.

In operation, prior to the addition of liquid from reservoir 13 to reactor 17, the valve locking bar 42 of adjusting system 11 is in the position shown in FIG. 1. When it is desired to add liquid to reactor 17 from reservoir 13, locking bar 42 is displaced to the left as seen in FIG. 1 until release slot 46 is in alignment with wheel member 37 of valve 19. Wheel member 37 of valve 19 thus is unrestrained for operation and is rotated by an operator to a "full-open" position to thereby provide for the passage of a slug of liquid from reservoir 13 into pipe section 26. Wheel member 37 of valve 19 is then rotated back to its original position to thereby close the valve. Some of the liquid in pipe section 26 passes into surge tank 30 but is prevented from filling the latter by the compression of gas in the top of the surge tank. When the valve 19 is closed the slug of liquid trapped between valve 19 and valve 20 is at a pressure comparable to the pressure in the reservoir 13. After the closing of valve 19, locking bar 42 is displaced to the right as seen in FIG. 1 until release slot 46 is in alignment with wheel member 37 of valve 20. Wheel member 37 of valve 20 is rotated to its full extent of movement to allow the slug of liquid in section 26 to move into pipe section 27 whereupon valve 20 is closed. The positioning of slot 46 of bar 42 in alignment with the succeeding valves 21, 22 and 23 and the sequential operation of the latter are continued so that, eventually, a fraction of the slug of liquid from reservoir 13 is added to reactor 17.

The present invention requires the use of a pressure in reservoir 13 which is considerably higher than that in reactor 17 to effect the movement of the slug of liquid forward as the valves are sequentially opened and closed. To more clearly show the variation of pressures in the system as the valves are manipulated, a Table A is shown below to indicate, by way of example, the pressure values within the reservoir 13, reactor 17 and surge tanks 30 to 33 under different conditions of valve operation:

Table A

| Open Valves | Pressure Readings, p.s.i. | | | | | |
|---|---|---|---|---|---|---|
| | Reservoir 13 | Surge Tank 30 | Surge Tank 31 | Surge Tank 33 | Surge Tank 33 | Reactor 17 |
| Initially, all closed | 2,400 | 2,300 | 2,200 | 2,100 | 2,000 | 2,000 |
| 19 | 2,400— | 2,400— | 2,200 | 2,100 | 2,000 | 2,000 |
| 20 | 2,400— | 2,300 | 2,300 | 2,100 | 2,000 | 2,000 |
| 21 | 2,400— | 2,300 | 2,200 | 2,200 | 2,000 | 2,000 |
| 22 | 2,400— | 2,300 | 2,200 | 2,100 | 2,100 | 2,000 |
| 23 | 2,400— | 2,300 | 2,200 | 2,100 | 2,000+ | 2,000+ |
| Completed, all closed | 2,400— | 2,300 | 2,200 | 2,100 | 2,000+ | 2,000+ |

Let it be assumed that the valves are all closed, the pressure within the reservoir 13 is 2400 p.s.i. and in reactor tank 17 it is 2000 p.s.i.; the pressures in the surge tanks being shown in the first line in the Table A corresponding to the legend "Initially, all closed." It will be seen that when valve 19 is opened, the pressure within reservoir 13 is at a value slightly less than 2400 p.s.i. and the pressure within surge tank 30 becomes the same. Since the remaining valves are closed, the pressures within their associated surge tanks remain the same as indicated in the first line of the table. Upon reclosing valve 19 and opening valve 20, the pressure in reservoir 13 remains at slightly less than 2400 p.s.i., surge tank 30 returns to its former pressure of 2300 p.s.i. and the pressure within surge tank 31 rises from 2200 to 2300 p.s.i. The values within the remaining surge tanks remain the same. It will be evident from an examination of Table A and without further explanation here the resulting pressure values in the reservoir, reactor and surge tanks upon sequential operation of the remaining valves 21, 22 and 23.

From the foregoing, it may be understood that by the successive opening and closing of the valves in sequence, a fraction of the original slug of liquid is conducted into the reactor core. The size of the slug or the amount of liquid contained therein is determined by the dimensions of the piping and in the present invention the size of such slugs is small so that injection of one slug at any one time in the reactor does not produce dangerous power excursions.

It will now be apparent that the present invention provides for a novel adjustment system for supplying regulated amounts of fissionable fuel or additives in slug-like fashion to a reactor, thereby preventing the addition of excess fuel or additive to the reactor while in operation. By providing the described mechanism of the adjustment system for restraining operation of a valve until the preceding valve is closed, and sequential operation of the valves, careless operation by an operator does not cause dangerous power excursions in the reactor.

Although but one embodiment of the present invention has been illustrated and described in detail it is to be expressly understood that the invention is not limited thereto. Various changes can be made in the design and arrangement of the parts without departing from the spirit and scope of the invention as the same will now be understood by those skilled in the art.

What is claimed is:

1. In a fluid flow adjustment system for supplying liquid to a fluid-fuel nuclear reactor, a supply reservoir under pressure higher than that in the reactor and containing a liquid, a conduit in communication with the supply reservoir and the nuclear reactor for supplying liquid from said reservoir to the reactor, at least three valves for said conduit and connected in series for controlling the flow of liquid from said reservoir to the reactor, said valves separating said conduit into two series-connected sections between the end valves, a wheel for each valve to actuate same to open and closed positions, a slot formed in the periphery of each of said wheels, and a slidable locking bar cooperating with the wheels of said valves and adapted for movement into the wheel slots when the valves are all in closed positions to thereby prevent operation of the valves, said locking bar having a release slot which when aligned with the slot in the wheel of one valve permits operation of said one valve and prevents operation of the other valves.

2. In a fluid flow adjustment system for supplying liquid to a fluid-flow nuclear reactor, a supply reservoir under pressure higher than in the reactor and containing a liquid, a conduit in communication with the supply reservoir and the nuclear reactor for supplying liquid from the reservoir to the reactor, at least three valves for said conduit connected in series for controlling the flow of liquid in said conduit and from said reservoir to the reactor, said valves separating said conduit into two series-connected sections between the end valves, an actuating member connected to each valve and movable to open and close the associated valve, a surge tank for each conduit section, each of said surge tanks having means for providing gas therein under a pressure intermediate the pressure of said reservoir and said reactor to impose pressure on the liquid in each conduit section, the surge tank for the section nearer the reservoir having a pressure greater than that of the surge tank nearer the reactor to provide for flow of liquid from the conduit section nearer to the reservoir into the next adjacent conduit section, a restraining member dimensioned to simultaneously engage each actuating member when the valves are in a fully closed position to prevent operation of the valves, said restraining member being supported for movement relative to said actuating members to disengage one of said actuating members and allow movement of that one actuating member to open the valve associated therewith while maintaining engagement with the other actuating members to prevent their movement and the operation of the valves associated therewith.

3. The fluid flow adjustment system of claim 2 wherein each actuating member is cylindrical in shape and mounted for rotation about its center to open and close the valve to which it is connected, each of said actuating members having a recess formed in the periphery thereof, and wherein the restraining member comprises a bar supported for slidable endwise movement within the recess of said actuating members, the bar having a slot therein which when aligned with the recess of an actuating member frees that actuating member for movement and operation of the valve associated therewith.

References Cited in the file of this patent

UNITED STATES PATENTS

| | | |
|---|---|---|
| 557,538 | Beard | Apr. 7, 1896 |
| 887,826 | Maniex | May 19, 1908 |
| 945,796 | Nicholas et al. | Jan. 11, 1910 |
| 2,116,885 | Friedman | May 10, 1938 |
| 2,692,617 | Jensen | Oct. 26, 1954 |
| 2,867,354 | Tanzola et al. | Jan. 6, 1959 |
| 2,929,767 | Hammond et al. | Mar. 22, 1960 |

OTHER REFERENCES

Perry: Chemical Engineers' Handbook, 3rd ed., McGraw-Hill Book Co., N.Y. (1950); page 1439.

Riegel: Chemical Process Machinery, 2nd ed., Reinhold Publishing Corp. (1953); pages 171–173.

Science, vol. 119 (Jan. 1, 1954), pages 9–11.